Feb. 16, 1960 E. NASSIMBENE 2,925,265
PNEUMATIC SPRING ASSEMBLY

Filed March 19, 1958 2 Sheets-Sheet 1

INVENTOR.
ERNEST NASSIMBENE
BY
John E. Reilly

INVENTOR.
ERNEST NASSIMBENE
BY John E. Reilly

United States Patent Office 2,925,265
Patented Feb. 16, 1960

2,925,265
PNEUMATIC SPRING ASSEMBLY

Ernest Nassimbene, Denver, Colo., assignor to The Gates Rubber Company, Denver, Colo., a corporation of Colorado Application March 19, 1958, Serial No. 722,430

2 Claims. (Cl. 267—65)

The present invention has relation to a vehicle suspension system of the class wherein pneumatic spring, or bellows type, assemblies are employed in the system to serve as load regulators and vibrational absorbers between the axle of the vehicle and the chassis.

As is well known in the vehicle suspension art, pneumatic spring assemblies offer many advantages not found in the conventional steel spring assemblies. At the same time, many difficulties are encountered in the design and construction of the pneumatic spring. As an example, increased life, and consistent performance in accord with original design characteristics are important considerations, together with space requirements, ability to control closely the riding and leveling characteristics of the spring assembly, and reliability in operation.

In the construction of air spring assemblies, it is common to employ a diaphragm forming with the end of a movable piston a closure across the open end of a container into which a source of high pressure air or other suitable gas is supplied. The diaphragm should be made highly flexible, yet should be capable of withstanding high pressures and continuous flexing under heavy loads in order to provide proper ride and leveling characteristics for the vehicle. As a result, a diaphragm of some elastomeric material, commonly reinforced rubber, has been found particularly suitable for attaining the desired characteristics. However, a disadvantage attending the use of elastomeric material, particularly rubber, in the diaphragm construction is its unfavorable growth characteristic in operation, so that the dimensions of the membrane or body portion of the diaphragm loosely extending between the piston and the container are gradually increased under continual flexing and high pressure, thus impairing the original effectiveness of the diaphragm and entire spring assembly. Moreover, the growth characteristics cannot always be strictly controlled nor predicted, and may vary for each diaphragm; therefore, both the riding and leveling characteristics of the suspension system for each wheel may vary over a period of time, making it difficult to control the entire suspension system. This is especially true where it may be desirable to maintain a pair of spring assemblies mounted on either the front or rear axle of a vehicle at the same level and pressure through the use of a single leveling valve and/or single source of supply.

It has been found possible to reduce and to control partially the variation in growth of the diaphragm or the tendency to lengthen, by controlling the cord treatment and also the angle of disposition of the reinforcing strands, or cords, normally imbedded in the diaphragm; but unfortunately, the variation of growth cannot be completely eliminated and in such cases may nevertheless have an adverse effect upon the performance of the suspension system. It is therefore a consequent and primary object of the present invention to eliminate the detrimental variation of diaphragm growth upon the operational characteristics of a vehicle suspension system.

It is another object to provide for a vehicle suspension system exhibiting consistent and easily controllable riding and leveling characteristics throughout the operational life of the system.

It is a further object to provide for a spring assembly conformable for use in conventional vehicle pneumatic suspension systems occupying a minimum amount of space, easily and accurately controllable in design, and which will operate to provide maximum wear and balance, along with the necessary vibrational and load absorbing qualities desired in a vehicle suspension system.

It is still a further object to provide for an improved and simplified pneumatic spring assembly construction which insures greatly increased reliability and consistency in operation.

Other and further objects of the present invention will become more apparent to those skilled in the art from the following description of a preferred embodiment of the invention taken together with the drawings, in which.

Figure 1:
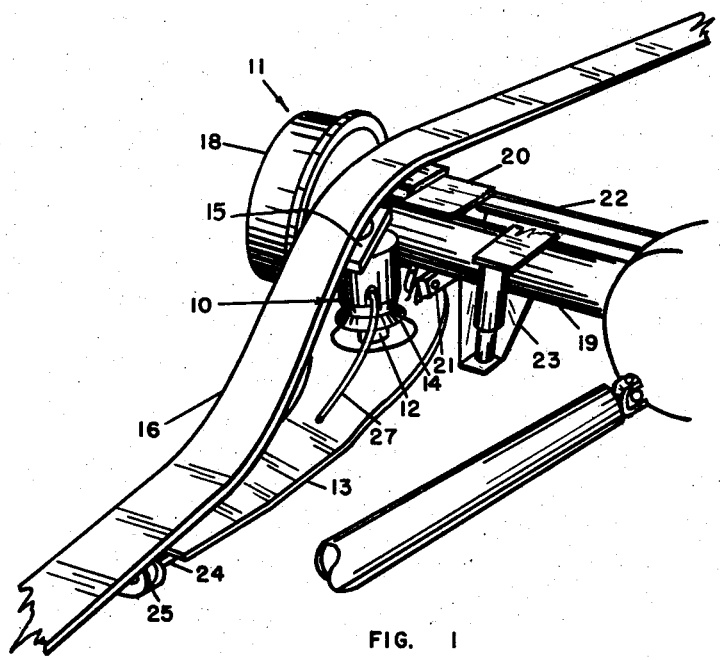
Figure 1 is a fragmentary perspective view of a portion of a rear wheel and axle assembly of a vehicle, illustrating in particular a pneumatic spring assembly in mounted position on the vehicle.

For the purposes of illustration only, a typical application of the pneumatic spring assembly of the present invention is shown in Figure 1, wherein a spring assembly 10 is mounted adjacent a rear axle and wheel assembly 11, the spring assembly 10 being broadly comprised of a piston or post member 12 disposed on a trailing or pivotal arm 13, and with an outer container 14 connected by means of a horizontal mounting plate 15 to a supporting frame 16 forming a part of the chassis of the vehicle. Loads imposed upon the rear axle wheel assembly, of which there is shown an axle hub portion 18 and axle housing 19, may be transmitted through the axle housing section to the spring assembly 10 by carrying the weight of the axle into the trailing arm 13 and interconnecting the members by means of a suitable bracket member 20 curving downwardly from its point of attachment to the axle housing 19 beneath the axle and into engagement with the trailing arm. The bracket 20 may be connected to the trailing arm 13 by any suitable means, such as rivets or bolts 21. To provide additional support for the axle housing unit, there is also shown a frame cross member 22, together with a supplementary shock absorber system 23, both being well known in the art.

In order to provide for proper reciprocal movement and to transmit the loads imposed upon the axle into the spring assembly, the trailing arm 13 forms a fulcrum which is pivotally mounted at its forward end to the frame 16 by means of a pin 24 and bracket 25 secured to and extending rearwardly from the frame 16 so that the trailing arm 13 will swing in a vertical plane about the pin at the point of attachment to the frame member 16. To dampen effectively and absorb the impact forces applied to the centering post 12, the pneumatic spring assembly is further comprised of a diaphragm 26, as more clearly shown in Figure 2, which forms with the centering post 12 an air tight closure across the open end of the container 14. In this way, the container 14 may serve as a reservoir for the introduction of air, or a suitable gas, under high pressure through a supply line 27 connected into the container by any suitable means, the supply line 27 being led from a source of high pressure air, such as a compressed air tank, all in a well-known manner. By selectively controlling the pressure of the air within the container, it is thereby possible to control, in turn, the extent of movement of the centering post 12 and the diaphragm 26, as loads are transmitted thereto. This may be accomplished by means of a suitable regulator valve (not shown) connected into the supply line, together with another suitable valve, commonly termed a leveling valve (also not shown), in line 27 which serves to control automatically the riding height of the vehicle at all times. For example, as the pressure within the container is increased under a constant load, the container 14 will of course tend to move gradually upwardly with respect to the centering post and the diaphragm member so as to raise the entire vehicle with respect to the axle housing and wheel assembly.

An important consideration in the construction of the assembly is a way of properly securing the diaphragm to the centering post and to the container 14. With this in mind, the centering post 12 is given a leading or terminal end 28 of reduced diameter, extending into a ledge or shoulder portion 29 which in turn curves into a frusto-conical section 30 having an upper inclined side 31 and a lower inclined side 31' followed by a cylindrical section 32 extending downwardly to the point of connection of the post to the trailing arm 13. The container 14 is mounted to the frame in centered position over the post, and is comprised of a generally cylindrical body portion 34 which is given a slight downward taper, and a ledge or shoulder 35 extending laterally and inwardly from the end of the body portion of the container. Forming a downward extension of the container from the open end thereof is a skirt 36 having a tapered section 37 and an outwardly flared section 38.

Both the centering post 12 and the container 14 may be formed of any suitable material, but are preferably made of a metal, such as steel. In addition, the centering post may be either hollow or solid, depending upon the amount of the loads to be transmitted therethrough and of course the material used in its construction.

Figure 2:
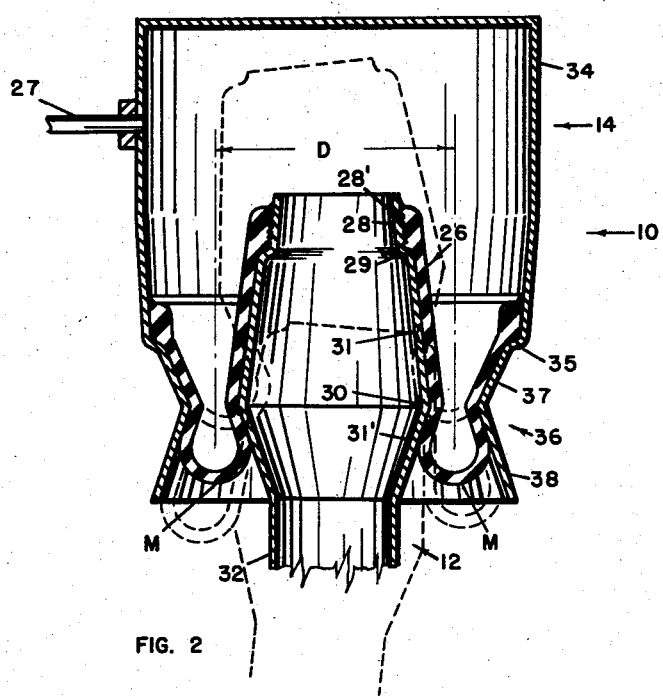
Figure 2 is a vertical section view through the spring assembly shown in Figure 1 illustrating the relative disposition and location of parts in accordance with the present invention.
Figure 3:
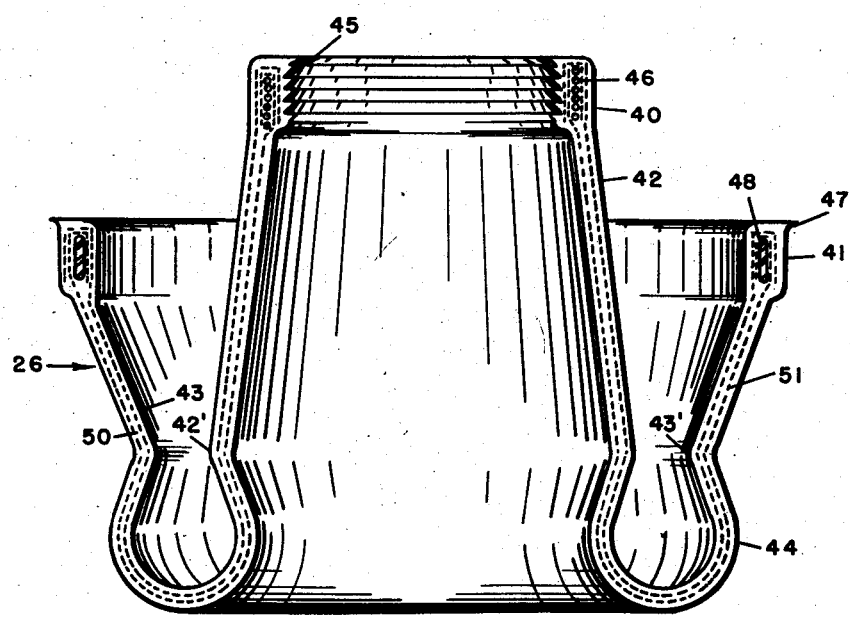
Figure 3 is a detailed, vertical section view illustrating the construction of a preferred form of diaphragm member, conformable for use in the pneumatic spring assembly of the present invention.

As shown in Figure 2 and in more detailed form in Figure 3, the generally cylindrical diaphragm member 26 is provided with enlarged or thickened ends including a collar 40 located at the innermost edge of the diaphragm, and a rim 41 forming the outer periphery of the diaphragm. Disposed between the collar 40 and the rim 41 is a flexible body or membrane portion made up of inner and outer inclined wall sections 42 and 43 which extend downwardly in a common direction from the collar and the rim, respectively. The inclined wall sections 42 and 43 are terminated in relatively near, free end portions 42' and 43', at which point they are loosely connected by means of a circumferentially extending lobe or roll 44 of a generally U-shaped cross-sectional configuration.

In order to obtain a tight, secure connection between the diaphragm 26 and the centering post 12 and container 14, the collar 40 is dimensioned so as to slip tightly over the leading end 28 of the centering post, and the rim 41 is dimensioned to engage tightly the inner surface of the container adjacent the open end thereof. In the latter, it has been found that the taper given to the body portion 34 of the container 14 materially aids in obtaining a secure connection.

In order to prevent any tendency of the diaphragm member 26 to be shifted or disengaged in the course of movement of the centering post 12, a unique manner of securing the collar and rim to the post and container, respectively, is provided. As shown, the collar 40 is given a number of upwardly disposed, vertically spaced teeth or lip portions 45 for engaging the leading end 28 of the post; also, a continuous strand 46, preferably cabled steel wire, may either be wrapped around or is preferably embedded in, the collar 40 so as to define an elastic or resilient spring forcing the lip 45 tightly against the leading end. In addition, the exterior surface of the leading end 28 is of generally saw-toothed configuration and defines a series of vertically spaced grooves 28' to receive and mate with the teeth 45. In this way, the shoulder portion 29, together with the grooved leading end 28 will securely hold the collar 40 in position under normal riding conditions. More important, however, as the air spring is moved to a position of maximum rebound, the unrolling of the body portion of the diaphragm will tend to stretch the lower wrap of wire forming the elastic spring which will, in turn, tend to tighten the wrap above it, and as each succeeding wrap of wire is stretched, the remaining wraps, or segments of the spring will become increasingly tightened so as to lock the teeth 45 against the collar even more securely.

The rim 41 may also be formed in the same general manner as the collar 40, and as shown, is given a single lip 47 extending laterally and outwardly from the upper exterior surface of the rim for engagement with the side of the container 14. Also, in place of the continuous strand 46, an endless band or flat ring 48 may be embedded in the enlarged end portion forming the rim 41 which is given an elastic force tending to urge the lip and entire rim outwardly into secure engagement with the container 14 and shoulder 35. It will therefore be evident that as the post is moved inwardly in compression, an inward movement of the lower part of the endless band 48 would tend to urge the upper portion of the band outwardly so as to secure greater locking engagement of the rim including the lip 47 with the side of the container. It is also preferred to give the lip 47 a very slight curvature on its underside so that as it is urged against the side of the container it will tend to flatten completely, thus eliminating any wave and assuring a tight fit with the container 14. Thus the endless band will operate effectively to establish the necessary outward force against the rim to obtain a secure and tight seal. On the other hand, the continuous strand of wire 46 is much more effective than an endless band in securing adequate engagement and sealing power of the collar 40 with the leading end 28. In fact it has been found sufficient to utilize the tooth edges 45 alone in combination with the resilient spring 46 without necessity of forming grooves on the leading end and nevertheless obtain an adequate seal and snug engagement between the two parts.

The diaphragm may be constructed of a number of plies represented at 50, preferably two plies as shown in Figure 3, of rubberized, calendered cord material surrounded by a gum cushion layer 51. The cords forming the plies are preferably of tire cord construction with the plies being disposed in crossed, diagonal relation at some predetermined angle to the longitudinal axis of the diaphragm. In this connection, the tendency of the diaphragm to "grow" or lengthen in operation may be materially reduced by proper cord treatment and regulation of this angle, although such may vary for each diaphragm and does not form a part of the present invention.

In forming the diaphragm 26 it may either be molded to shape, as shown in Figure 3, or may be molded in conical form followed by folding the rim 41 and inclined wall 43 back over the inner portion of the diaphragm to form the shape substantially as shown. The elastomeric or rubberlike material utilized in the diaphragm construction may be any of those conventionally used in the art, although a neoprene or Butyl rubber composition has been found particularly suitable.

An important feature of the pneumatic spring assembly of the present invention is the relative proportion and arrangement of and between the parts consisting of the lower conical section 31', the outwardly flared section 38 and the enlarged lobe 44. As previously mentioned, the reaction force applied against the centering post as it is moved in compression and rebound will be largely determined by the amount of pressure in container 14. Of course, the reaction force will also be a function of the effective area over which the pressure in the container is applied. It may be shown that this pressure will be effectively applied against the centering post and diaphragm only, the effective area being defined by a generally circular area having a projected diameter D. The diameter D may be determined for each position of the centering post 12 by measuring the distance between diametrically opposed points on a center line extending through the midpoint M of the diaphragm. Thus, as the centering post 12 moves upwardly in compression it is to be noted that the projected diameter D may be decreased gradually so that, notwithstanding the increase in pressure in the container, the effective area through which it is applied may be reduced to an extent either to maintain a constant force or even to reduce the effective force. However, in the absence of any means to control the projected diameter D this diameter will have a tendency to shift generally outwardly, due to lengthening of the diaphragm and since in conventional construction the centering post or piston will usually prevent inward expansion of the roll or lobe portion 44. In any event, without proper controlling means, growth or lengthening of the diaphragm may materially alter the projected diameter so that proper control of the effective area may be impossible. Furthermore, since the extent of growth cannot be predicted, as the diaphragm lengthens, it will have a different diameter D for each respective position to which the centering post is moved and in variance with the diameter for which it was originally designed.

Following the principles employed in the present invention, however, it has been found possible to eliminate the adverse effects of growth without affecting the other desirable operating characteristics of the spring assembly, especially at the neutral or riding height position. This is accomplished, in general, by constructing and arranging the lower inclined side 31' and outwardly flared section 38 so as to control the radial movement of the midpoint M notwithstanding any lengthening of the diaphragm. Since the lobe or roll is given either a generally circular, or a U-shaped configuration, in either form it is to be noted that the radial movement of the midpoint M will be controlled by the relative angular movement and changes in length of the sides of the lobe. As a result, it is only essential that the movement of the sides be controlled in order to properly center the midpoint M. For this purpose the lower conical side 31', and the outwardly flared section 38 are inclined in different directions as shown, but at equal angles. The sides 38 and 31' are in addition given a length so that at any position of the centering post with respect to the container under normal compression and rebound the sides 31' and 38 will operate to contain the sides of the lobe and maintain a predetermined space relationship between the sides at each corresponding point in travel of the system. For example, in the normal riding height position, as shown in full in Figure 2, notwithstanding any growth, particularly of the lobe portion of the diaphragm, the lobe will be forced to lengthen equally along either side of the outwardly flaring section 38 and lower conical section 31' so that the midpoint M may move only in a downward vertical direction along the center line; and, in general, for any minor change in relative position of the diaphragm under compression and rebound the midpoint M will be constrained to move along a predetermined path so that the variation in diameter D may be controlled. In this connection, although the sides defining the conical section 31' and flared section 38 are shown extending on a straight line, they may also be curved or in general of any configuration so long as they are disposed at an angle and a length to control the movement of the midpoint M.

It will be further evident from the above description that, although the upper conical section 31 and tapered section 37 aid materially in the rolling action of my preferred form of diaphragm 26, they do not play an essential part in maintaining a constant projected diameter D at the neutral riding position. Thus, it is entirely within the scope of the invention and as a modification thereof to utilize only the lower conical section 31 and the outwardly flaring section 38 in forming the center post 12 and container 14. As an example, the diaphragm may be formed to have only securing ends with a U-shaped lobe element extending between the ends; the ends would be then secured at some point adjacent to a container having only an outwardly inclining skirt and to a centering post having an inwardly inclining side with the lobe extending downwardly, having its sides contacting the walls of the skirt and the side. The inclined sections would then have a length sufficient to contact the sides of the lobe under maximum compression and rebound. Therefore, the length of the inclined sections would be largely dictated by the size of the lobe necessary in forming the flexible portion of the diaphragm.

Of course, in my preferred form of invention as shown in Figure 2, the upper inclined sides 31 and 37 may be utilized to cooperate with the lower inclined sides 31' and 38 as the diaphragm is moved in compression and rebound, as shown dotted in Figure 2. Thus, in compression, the sides of the lobe will engage the lower conical section 31' and upper inclined side 37; in rebound the lobe 44 will roll to a position with the sides contacting the upper conical section 31 and the lower inclined side 38. Throughout this movement, the diameter D will vary; yet at the same time selective variation of the diameter D is possible by controlling the relationship between the angles formed by the upper inclined sides with the opposite, lower inclined sides as the centering post and diaphragm move in compression and rebound. Again, predetermined variations in the diameter D may be predicted notwithstanding variations in growth of the diaphragm.

Moreover, the principles employed in the present invention to eliminate the effects of growth and to enable controlling the effective area of a single spring assembly, can be of immense importance in controlling the leveling action between a pair of spring assemblies mounted on either side of an axle assembly. As an example, by enabling one to predict the effective area of a spring assembly throughout its operating life, a pair of spring assemblies may be controlled in leveling by a single leveling valve, and nevertheless attain consistency and reliability in operation merely by disposing the inclined sides at equal angles.

While there has been shown a preferred form of the invention, it is to be understood that various changes may be made in its construction and the relative parts used in its construction without departing from the spirit and scope of the invention as defined in the appended claims.

I claim:

1. A pneumatic spring assembly for use in a vehicle suspension unit comprising: a container connected to the frame of said vehicle including an open end portion and including means for pressurizing said container; a piston member having a terminal end portion arranged for reciprocal movement through the open end of said container; a diaphragm member having outer and inner circumferentially extending walls inclining toward one another and terminating in relatively near free end portions; and an enlarged, generally U-shaped lobe loosely connecting said relatively near end portions, said container having a skirt sloping first inwardly from the side of said container for snugly engaging said outer wall, then flaring outwardly for normally contacting one side of said lobe adjacent to the area of connection of said lobe with said outer wall; said outer and inner circumferentially extending walls being provided with upper thickened ends for engagement with the side of said container adjacent the open end thereof and with the terminal portion of said piston, each of said thickened end portions incorporating therein a resilient spring member for pressing said thickened ends into increased engagement adjacent one segment of said spring as another segment of said spring and thickened end are forced in a direction away from engagement with the side of said container and said terminal portions, respectively.

2. A pneumatic spring assembly according to claim 1 wherein said thickened end portions include a plurality of teeth for engaging the side of said container and said terminal portion, and said resilient spring is defined by a continuous cable wrap imbedded in each of said thickened end portions.

References Cited in the file of this patent

UNITED STATES PATENTS

| | | |
|---|---|---|
| 971,583 | Bell | Oct. 4, 1910 |
| 1,503,985 | Corson | Aug. 5, 1924 |
| 1,813,176 | Leguillon | July 7, 1931 |

FOREIGN PATENTS

| | | |
|---|---|---|
| 13,713 | Great Britain | of 1898 |
| 1,141,285 | France | Mar. 11, 1957 |

(Corresponding to British Patent Continental 788,973, Jan. 8, 1958)

OTHER REFERENCES

"General Motors Engineering Journal," volume 4, July-August-September 1957 (pages 21–27 relied on).

Germany (Kl. 63c 41), Ser. No. M24679, printed Oct. 31, 1956.